April 13, 1948. T. JACKSON 2,439,472
INDUCTION SYSTEM FOR MULTICYLINDER OPPOSED PISTON ENGINES
Filed May 8, 1945 5 Sheets-Sheet 1

INVENTOR.
Thomas Jackson
BY
G. F. Hauke
Attorney

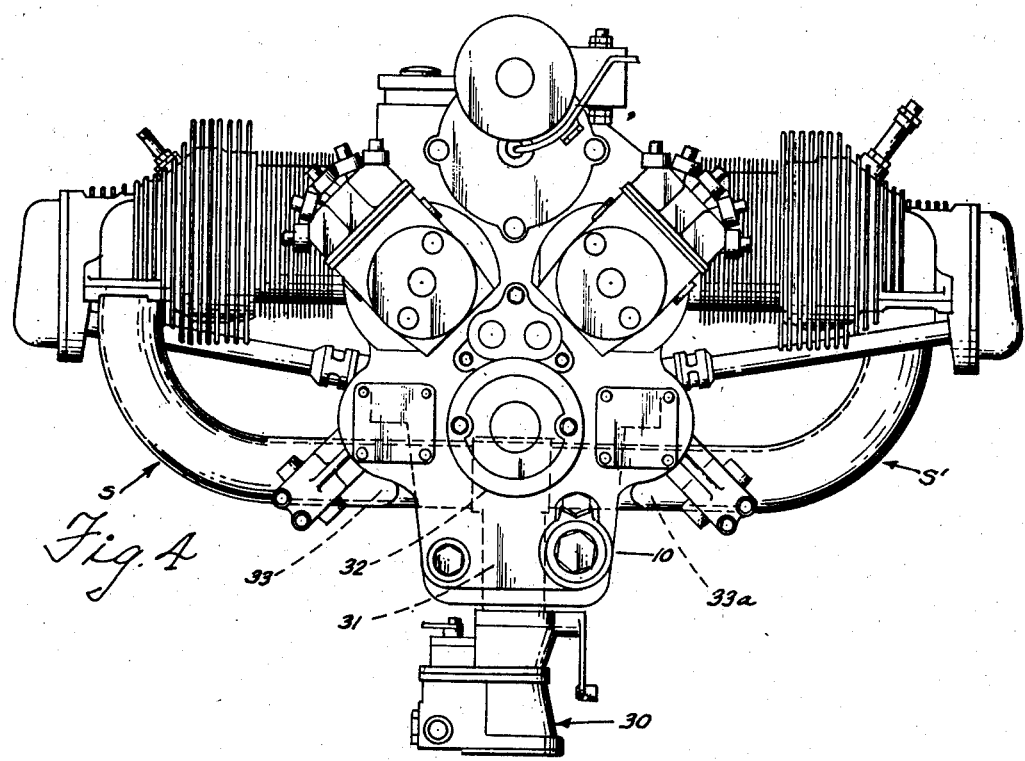
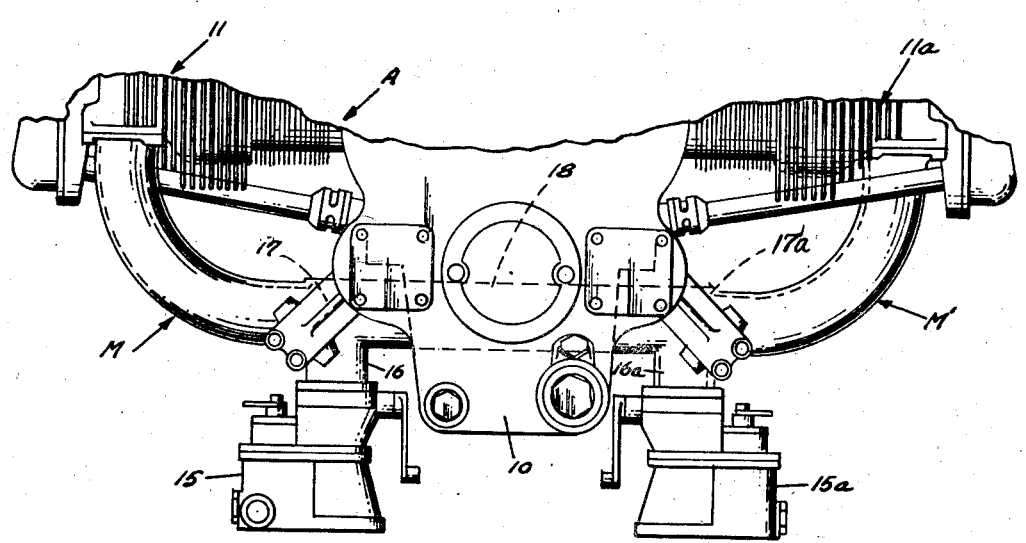

April 13, 1948.  T. JACKSON  2,439,472
INDUCTION SYSTEM FOR MULTICYLINDER OPPOSED PISTON ENGINES
Filed May 8, 1945  5 Sheets-Sheet 5

INVENTOR.
Thomas Jackson
BY
Attorney

Patented Apr. 13, 1948

2,439,472

UNITED STATES PATENT OFFICE 2,439,472

INDUCTION SYSTEM FOR MULTICYLINDER OPPOSED PISTON ENGINES

Thomas Jackson, North Muskegon, Mich., assignor to Continental Motors Corporation, Muskegon, Mich., a corporation of Virginia Application May 8, 1945, Serial No. 592,590

16 Claims. (Cl. 123—56)

My invention relates to internal combustion engines and more particularly to an induction system which more especially applies to a multicylinder type.

An object of my invention is to construct an improved opposed cylinder engine embodying a compact arrangement by providing therefore an induction system assembled generally underneath the engine and providing manifold structures serving to individually distribute the fuel mixture and conduct same to the various engine cylinders.

It will also be noted in general that the induction system as applied to an engine of the type described, may be one that distributes and conducts a fuel mixture to the engine cylinders or one which distributes air thereto in conjunction with a separate fuel injection system.

Figure 1:
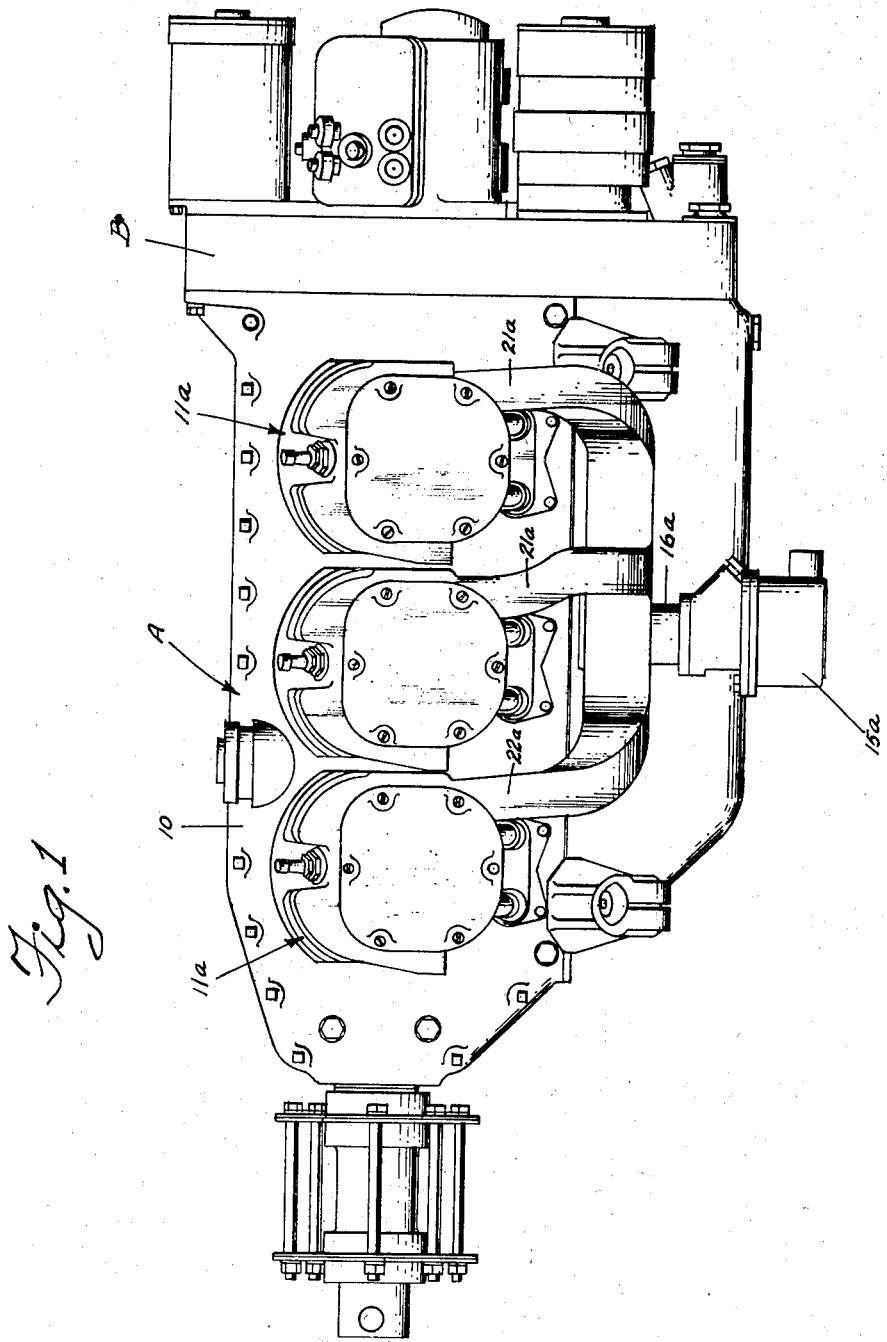
Figure 2:
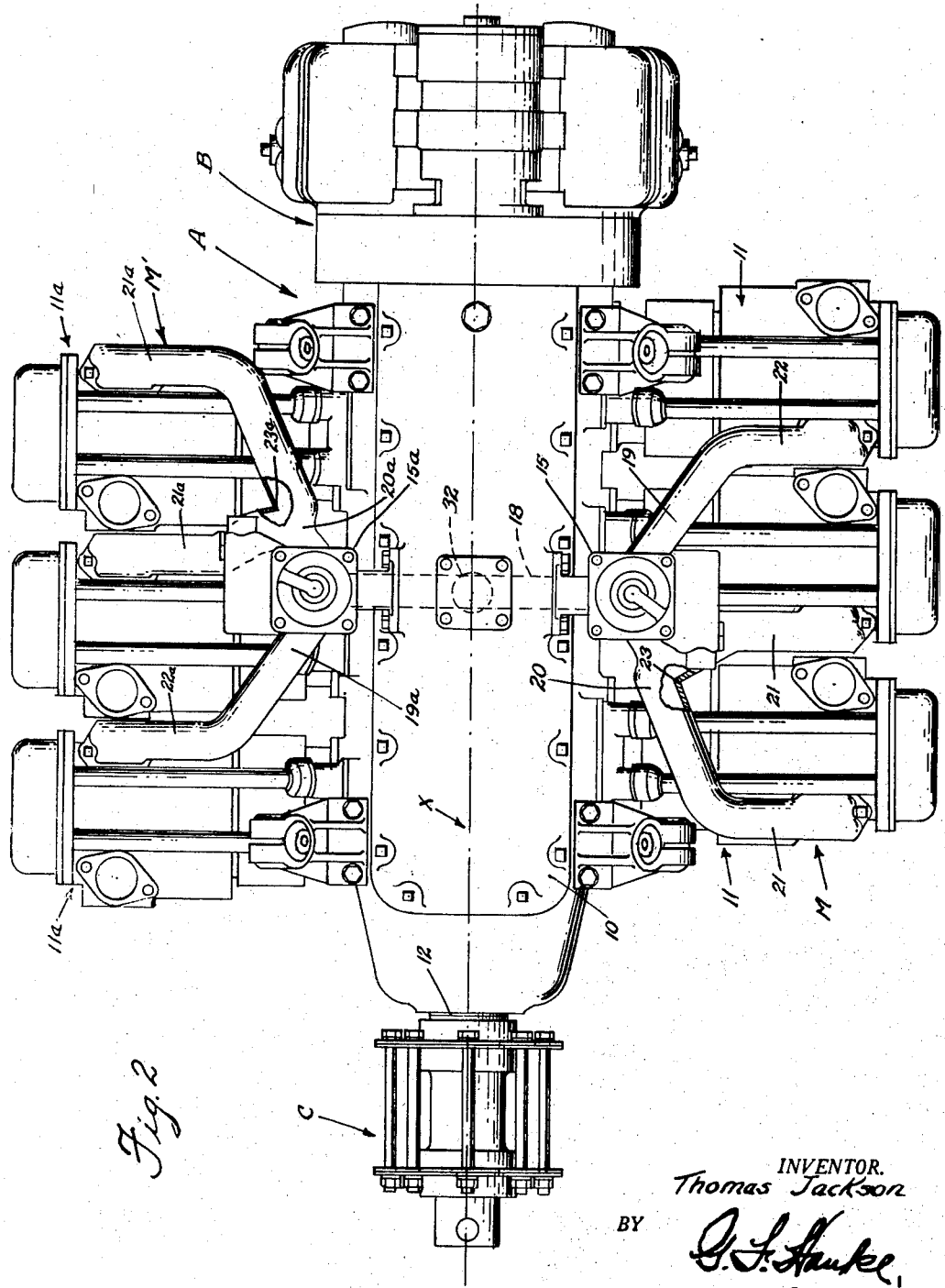
Figure 5:
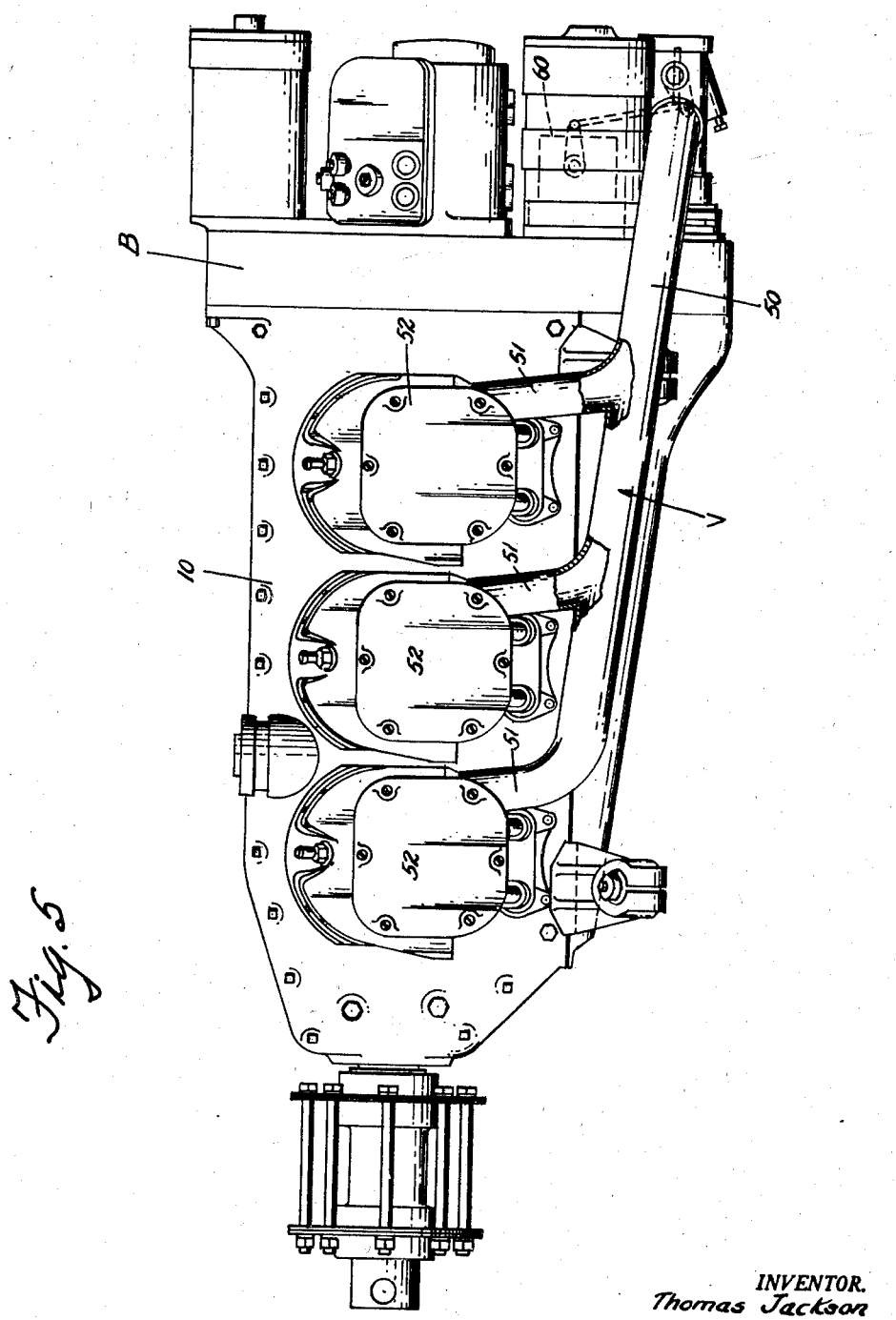
Figure 6:
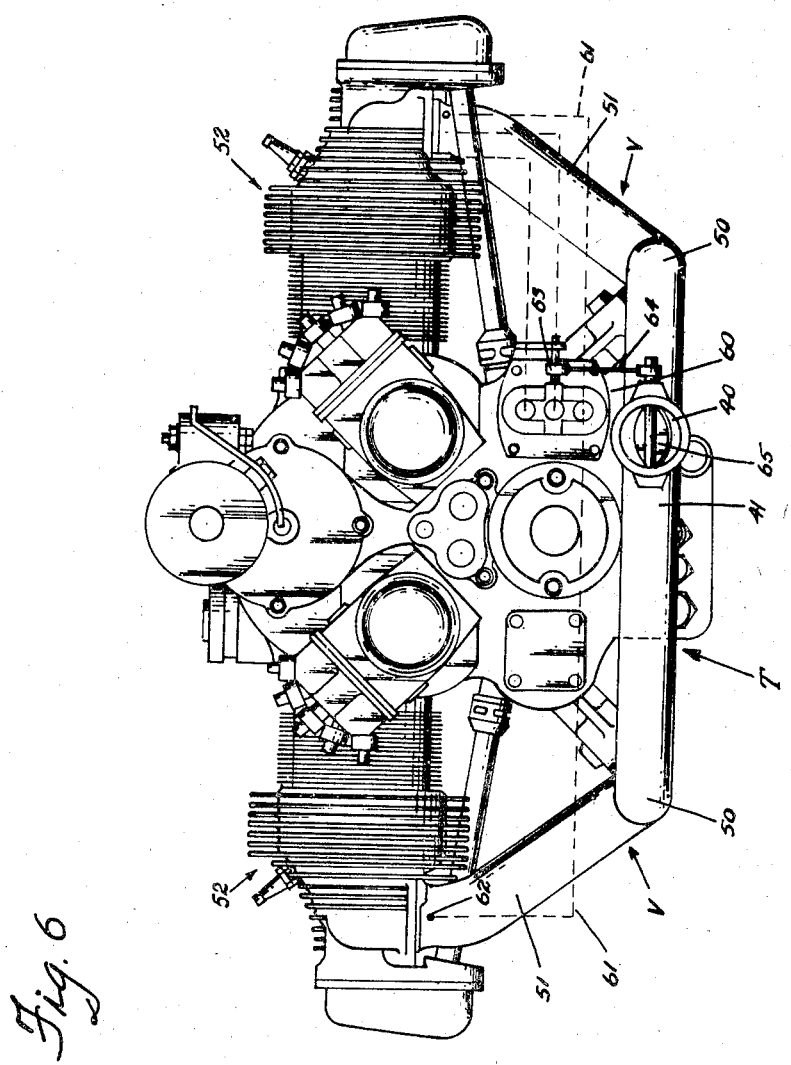

For a more detailed understanding of my invention, reference may be had to the accompanying drawings, illustrating preferred embodiments of my invention and in which like characters refer to like parts throughout the several views and in which:

Fig. 1 is a side elevational view of an opposed cylinder engine embodying an induction system supplied with fuel mixture from a dual carburetor assembly, Fig. 2 is a plan view thereof, Fig. 3 is a fragmentary end view of the same engine, Fig. 4 is an end view of a horizontally opposed cylinder engine embodying in general a similar induction system constructed to be supplied from a single carburetor, Fig. 5 is a side elevational view of an opposed cylinder engine equipped with a fuel injector and an induction system, and Fig. 6 is an end elevational view of the engine illustrated in Fig. 5.

The engine illustrated more particularly in Figs. 1 to 3 is designated generally by the reference character A and comprises a crankcase structure 10 to which is secured a plurality of engine cylinders 11 and 11a respectively secured to the crankcase and extending horizontally in opposed relation, said engine cylinders being preferably staggered as shown more particularly in Fig. 2. A conventional gear case structure B is secured to the engine crankcase and a propeller hub C is secured in the conventional manner to the engine crankshaft 12.

The induction system for this engine comprises a pair of manifold structures M and M' respectively associated with the bank of cylinders 11 and 11a, each of said manifold structures being supplied with a fuel mixture forming devices or carburetors 15 and 15a. Each of said carburetors 15 and 15a are connected with risers 16 and 16a, each of which are in open communication respectively with a fuel mixture distributing chambers 17 and 17a, said distributing chambers being openly connected by a transverse conduit 18 which extends traversely through the engine crankcase 10.

The distributing chamber 17 connects with longitudinally extending secondary fuel mixture conducting portions 19 and 20 while the distributing chamber 17a is openly connected with secondary longitudinally extending conducting portions 19a and 20a. The secondary conducting portion 20 is branched to provide the port runners 21 leading to cylinders 11 while conduit 19 terminates in a port runner 22 running to another of said cylinders 11. The conduit 20a is branched to provide the port runners 21 leading to cylinders 11 while conduit 19 terminates in a port runner 22 running to another of said cylinders 11. The conduit 20a is branched to provide port runners 21a leading to a pair of cylinders 11a while conduit 19a terminates in a port runner 22a leading to the remaining cylinder 11a. A fuel mixture dividing means such as a split 23 is constructed intermediate said branched port runners 21 while a split 23a is similarly constructed intermediate the branched port runners 21a. These manifold structures M and M' are both preferably constructed of conduit portions which are rectangular in cross-section and located substantially beneath the engine cylinders. Said port runners in all cases extending first longitudinally of the engine but outwardly sloped with respect to the crankshaft, and terminating in port runner portions extending generally substantially in planes which are normal to the engine crankshaft axis X, and are further constructed to extend upwardly for connection with the engine cylinders as shown more particularly in Figs. 1 and 3. In addition it would be noted that the secondary conducting means of both manifold structures comprise conduits of substantially equal length and rectangular construction in cross-section.

It will be further noted that the risers 16 and 16a extend generally upwardly from the carburetors 15 and 15a alongside the crankcase 10.

It will be further noted that the secondary conduits 20 and 20a comprise a closed conduit from the distributing chambers 17 and 17a to the points where said splits 23 and 23a are located, which closed conduits are of sufficient length to permit fuel mixture flow to obtain equilibrium of flow before being divided by said split and uniformly distributed to the port runners 21 and 21a respectively.

In Fig. 4 I have illustrated the modified construction in which the engine is supplied with a single carburetor 30 connected with a riser 31 extending upwardly through the crankcase 10 to a distributing chamber 32, said chamber 32 being openly connected with the transverse conduit 18 extending through the crankcase 10. In this construction the manifold structures S and S' are constructed somewhat similarly to manifold structures M and M' except that the main distributing chamber of said manifold structures is located interiorly of the crankcase and the transverse fuel mixture conducting conduit 18 distributes the fuel mixture in oppositely extending conduit portions to secondary distributing chambers 33 and 33a, which respectively distribute the fuel mixture to the manifold conduits of the manifold structures S and S' which are constructed similarly to the conducting means 19, 20, 21 and 22 as shown in Fig. 2.

In Figs. 5 and 6 I have illustrated a modified induction system which is more particularly applicable to a fuel injection engine. The air induction manifold T having an inlet 40, is constructed to provide a primary transverse conducting portion 41 extending transversely of the engine and at a level below the plane of the engine cylinders. The transverse conducting portion 21 thus conducts air in opposite directions from inlet 40 to the manifold structures V and V' both of which are constructed identically and are suitably branched to divide the air flow and conduct the air to the individual engine cylinders. The manifold structure V comprises a secondary conducting portion 50 which extends longitudinally of the engine and slopes generally upwardly from the rear towards the forward end of said engine as shown clearly in Fig. 5. Branch conduits 50 connect with cylinders 52 secured to the crankcase 10 and these branch conduits or port runners 51 are constructed to extend generally upwardly to connection with cylinder intake means on the underneath side of the engine cylinders 52. A fuel injector pump 60 is secured to the rear face of the gear case B and is provided with fuel lines 61 leading to the various engine cylinders, said fuel lines preferably terminating in fuel outlets 62 constructed in the manifold port runners 51 at a point adjacent to the cylinder intake parts.

The fuel injection pump is controlled in a conventional manner by a throttle 63 which is linked by a connection 64 with a butterfly valve 65 controlling the intake of air into said air intake port 40. It will be observed that the port runners 51 as well as port runners 21 and 22 are all constructed to curve generally outwardly and upwardly with respect to the engine crankcase and are in all cases connected with cylinder intake ports on the underneath side of the engine cylinders. In fact, the engines here illustrated are so constructed as to be selectively connected with any one of the induction systems described herein.

It will be apparent to those skilled in the art to which my invention pertains, that various modifications and changes may be made therein without departing from the spirit of my invention or from the scope of the appended claims.

I claim:

1. A fuel induction system for a horizontal opposed multi-cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising conducting means extending generally longitudinally of the engine and horizontally outwardly with respect to the vertical longitudinal central axial plane of the engine and terminating in separate upwardly extending conducting conduit portions connected with cylinder intake ports on the underside of said engine cylinders.

2. A fuel induction system for a horizontally opposed multi-cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising conducting means extending generally longitudinally of the engine and horizontally outwardly with respect to the vertical longitudinal central axial plane of the engine and terminating in separate upwardly extending conducting conduit portions connected with cylinder intake ports on the underside of said engine cylinders, said secondary conducting means comprising conduits of substantially equal length and substantially rectangular in cross section.

3. A fuel induction system for a horizontally opposed cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising a manifold assembly provided with conducting means extending horizontally outwardly with respect to the vertical longitudinal central axial plane of the engine and terminating in separate upwardly extending conducting conduit portions connected with cylinder intake ports on the underside of said engine cylinders, said induction system comprising substantially similar manifold fuel conducting means respectively associated with both banks of engine cylinders, said manifold fuel conducting means separated by the engine crankcase, and conduit means connecting said manifold fuel conducting means and extending transversely through the interior of said crankcase.

4. A fuel induction system for a horizontally opposed cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising a manifold assembly provided with conducting means extending horizontally outwardly with respect to the vertical longitudinal central axial plane of the engine and terminating in separate upwardly extending conducting conduit portions connected with cylinder intake ports on the underside of said engine cylinders, said induction system comprising substantially similar manifold fuel conducting means respectively associated with both banks of engine cylinders, said manifold fuel conducting means separated by the engine crankcase, and conduit means connecting said manifold fuel conducting means and extending transversely through the interior of said crankcase, a fuel mixing and forming device connected with each of said manifold fuel conducting means and separate risers connecting said devices with the fuel distributing chamber of each manifold fuel conducting means.

5. A fuel induction system for a horizontally opposed cylinder engine comprising a fuel mixing and forming means located substantially beneath said engine, a fuel mixture distributing chamber, a primary fuel mixture riser openingly connecting said means with said chamber, and secondary fuel mixing conducting means connecting said chamber with the engine cylinders and comprising a manifold assembly provided with conducting means extending horizontally outwardly with respect to the vertical longitudinal central axial plane of the engine and terminating in separate upwardly extending conducting conduit portions connected with cylinder intake ports on the underside of said engine cylinders, said induction system comprising substantially similar manifold fuel conducting means respectively associated with both banks of engine cylinders, said manifold fuel conducting means separated by the engine crankcase, and conduit means connecting said manifold fuel conducting means and extending transversely through the interior of said crankcase, a fuel mixing and forming device connected with each of said manifold fuel conducting means and separate risers connecting said devices with the fuel distributing chamber of each manifold fuel conducting means, said risers lying adjacent the side of said engine crankcase.

6. A fuel induction system for a horizontally opposed cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with engine cylinders and comprising oppositely extending conduits extending longitudinally of the engine and obliquely outwardly with respect to the central longitudinal vertical plane of the engine and terminating in outwardly and upwardly conducting portions each connecting with a cylinder intake port, and an intermediate fuel conducting port runner connected with an intermediate cylinder and with one of said conduits at a point adjacent to said chamber and whose wall portion remote from said chamber forms a fuel mixture split with a wall of the conduit which is spaced from the said distributing chamber a distance such as to provide a closed conduit of sufficient length to permit the fuel mixture flow to obtain equilibrium of flow before being divided by said split and distributed substantially uniformly to said port runner and to said conduit leading to the end cylinder, said conduits and said port runner each terminating in upwardly extending portions for connection with cylinder intake ports on the underneath side of the engine cylinders.

7. A fuel induction system for a horizontal opposed cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising a manifold assembly provided with conducting means extending horizontally outwardly with respect to the vertical longitudinal central axial plane of the engine and terminating in separate upwardly extending conducting conduit portions connected with cylinder intake ports on the underside of said engine cylinders, said fuel mixing and forming means comprising a carburetor located underneath the engine crankcase, said riser extending within the crankcase and connected with said secondary fuel mixture conducting means.

8. A fuel induction system for a horizontal opposed cylinder engine comprising a fuel mixing and forming means located substantially beneath said engine, a fuel mixture distributing chamber, a primary fuel mixture riser openingly connecting said means with said chamber, and secondary fuel mixture conducting means connecting said chamber with the engine cylinders and comprising a manifold assembly provided with conducting means extending horizontally outwardly with respect to the vertical longitudinal central axial plane of the engine and terminating in separate upwardly extending conducting conduit portions connected with cylinder intake ports on the underside of said engine cylinders, said fuel mixing and forming means comprising a carburetor located underneath the engine crankcase, said riser extending within the crankcase and connected with said secondary fuel mixture conducting means.

9. An induction system for an engine of the horizontal opposed cylinder type comprising a manifold assembly including a horizontally extending transverse conduit lying in a horizontal plane extending below the plane of the engine cylinders and provided with an intermediate inlet means, and a pair of secondary conducting portions each respectively connected to one end of said transverse conduit and extending longitudinally of the engine underneath the engine cylinders, and branch conducting portions connecting said secondary conducting portions with said engine cylinders, said branch conducting portions extending laterally outwardly and upwardly with respect to the central longitudinal vertical engine plane.

10. An induction system for an engine of the horizontally opposed cylinder type comprising an air manifold assembly including a transverse conduit provided with an intermediate inlet means, and secondary conducting portions extending longitudinally of the engine underneath the engine cylinders and branch conducting portions connecting said secondary conducting portions with said engine cylinders, said branch conducing portions extending laterally outwardly and upwardly with respect to the central longitudinal vertical engine plane, said engine provided with a fuel injection pump and fuel conduits connecting said pump outlets with said branch conducting portions substantially adjacent to where same are connected with said engine cylinders.

11. An induction system for an engine of the horizontal opposed cylinder type comprising an air manifold assembly including a horizontally extending transverse conduit lying in a horizontal plane extending below the plane of the engine cylinders and provided with an intermediate inlet means, and a pair of secondary conducting portions each respectively connected to one end of said transverse conduit and extending longitudinally of the engine underneath the engine cylinders and branch conducting portions connecting said secondary conducting portions with said engine cylinders, said branch conducting portions extending laterally outwardly and upwardly with respect to the central longitudinal vertical engine plane, said secondary conducting portions inclined upwardly towards the forward end of said engine.

12. An induction system for an engine of the horizontal opposed cylinder type comprising an air manifold assembly including a transverse conduit provided with an intermediate inlet means, and secondary conducting portions extending longitudinally of the engine underneath the engine cylinders and branch conducting portions connecting said secondary conducting portions with said engine cylinders, said branch conducting portions extending laterally outwardly and upwardly with respect to the central longitudinal vertical engine plane, said secondary conducting portions inclined upwardly towards the forward end of said engine, all said branch conducting portions obliquely inclined with respect to said secondary conducting portions and connected therewith with a relatively large radius curved unrestricted elbow connection.

13. An induction system for an engine of the horizontally opposed cylinder type comprising an air manifold assembly including a transverse conduit provided with an intermediate inlet means, and secondary conducting portions extending longitudinally of the engine underneath the engine cylinders and branch conducting portions connecting said secondary conducting portions with said engine cylinders, said branch conducting portions extending laterally outwardly and upwardly with respect to the central longitudinal vertical engine plane, said engine provided with a fuel injection pump and fuel conduits connecting said pump outlets with said branch conducting portions substantially adjacent to where same are connected with said engine cylinders, said intake of said air manifold located adjacent to said fuel injector pump, an air valve associated with said air intake, a fuel supply control device associated with said fuel injector pump, and linkage connecting said air valve with said fuel supply control devices.

14. A fuel induction system for a horizontally opposed multi cylinder internal combustion engine having a crankcase, and comprising similar and substantially identical induction systems for each bank of engine cylinders, each comprising a fuel mixing and forming means located substantially beneath said engine, a fuel mixer distributing chamber, a primary fuel mixer riser openly connecting said means with said chamber, and secondary fuel mixture conducting means connecting said chamber with the engine cylinders, and conduit means extending transversely of the engine and openly connecting the distributing chambers.

15. A fuel induction system for a horizontally opposed multi cylinder internal combustion engine having a crankcase, and comprising similar and substantially identical induction systems for each bank of engine cylinders each comprising a fuel mixing and forming means located substantially beneath said engine, a fuel mixer distributing chamber, a primary fuel mixer riser openly connecting said means with said chamber, and secondary fuel mixture conducting means connecting said chamber with the engine cylinder, said engine crankcase depending from said engine and separating said distributing chambers, and conduit means extending generally horizontally and transversely of the engine and through the interior of said crankcase and openly connecting said distributing chambers.

16. A fuel induction system for a horizontally opposed multi cylinder internal combustion engine having a crankcase, and comprising similar and substantially identical induction systems for each bank of engine cylinders, each comprising a fuel mixing and forming means located substantially beneath said engine, a fuel mixer distributing chamber, a primary fuel mixer riser openingly connecting said means with said chamber, and secondary fuel mixture conducting means connecting said chamber with the engine cylinders, and conduit means openly connecting said distributing chambers and extending transversely through the crankcase of the engine.

THOMAS JACKSON.

REFERENCES CITED

The following references are of record in the file of this patent:

UNITED STATES PATENTS

| Number | Name | Date |
|---|---|---|
| 1,274,813 | Sullivan | Aug. 6, 1918 |
| 1,339,447 | Field | May 11, 1920 |
| 1,502,240 | Ford | July 22, 1924 |
| 2,074,702 | MacClatchie | Mar. 23, 1937 |
| 2,290,936 | Bakewell | July 28, 1942 |